(12) United States Patent
Cooper et al.

(10) Patent No.: US 7,346,566 B2
(45) Date of Patent: Mar. 18, 2008

(54) METHOD FOR ASSESSING EQUITY ADEQUACY

(75) Inventors: Christine M Cooper, Hornchurch (GB); Mike Gulkewicz, Canton, MI (US); Mario Spivak, Ann Arbor, MI (US); Mark Turner, West Bloomfield, MI (US); Neil Schloss, West Bloomfield, MI (US); Paul Duncan McCarthy, Ann Arbor, MI (US); Ron Alan Pollard, Novi, MI (US); Yong Yang, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 1623 days.

(21) Appl. No.: 09/681,902

(22) Filed: Jun. 22, 2001

(65) Prior Publication Data

US 2002/0198797 A1    Dec. 26, 2002

(51) Int. Cl.
*G06Q 40/00* (2006.01)
(52) U.S. Cl. .................. 705/35; 705/36 R; 705/38
(58) Field of Classification Search ............ 705/35–40, 705/10; 703/2
See application file for complete search history.

(56) References Cited

U.S. PATENT DOCUMENTS

| | | | |
|---|---|---|---|
| 4,597,046 A | 6/1986 | Musmanno et al. | |
| 5,220,500 A | 6/1993 | Baird et al. | |
| 5,406,477 A | 4/1995 | Harhen | |
| 5,615,109 A | 3/1997 | Eder | |
| 5,704,045 A * | 12/1997 | King et al. | 705/35 |
| 5,884,285 A | 3/1999 | Atkins | |
| 5,918,210 A | 6/1999 | Rosenthal et al. | |
| 6,044,354 A | 3/2000 | Asplen, Jr. | |
| 6,044,357 A | 3/2000 | Garg | |
| 6,055,517 A | 4/2000 | Friend et al. | |
| 6,078,904 A * | 6/2000 | Rebane | 705/36 R |
| 6,112,188 A | 8/2000 | Hartnett | |
| 6,115,697 A | 9/2000 | Gottstein | |
| 6,138,102 A | 10/2000 | Hinckley, Jr. | |
| 2002/0198822 A1* | 12/2002 | Munoz et al. | 705/38 |
| 2003/0110016 A1* | 6/2003 | Stefek et al. | 703/2 |

\* cited by examiner

*Primary Examiner*—Hani Kazimi
*Assistant Examiner*—Olabode Akintola
(74) *Attorney, Agent, or Firm*—Gary A. Smith; Brooks Kushman P.C.

(57) ABSTRACT

Risk-based method for assessing an automotive finance company's equity adequacy wherein sources of creditor protection comprises equity, reserves, net deferred tax liability in the event of an overall loss, future tax liability and lifetime profits. Potential unexpected worst-case losses for each of a plurality of exposures is estimated with 99.9% confidence and compared with the company's creditor protection to demonstrate the company's equity adequacy.

8 Claims, 17 Drawing Sheets

|  | CREDIT | RESIDUAL | OTHER | TOTAL |
|---|---|---|---|---|
| UNEXPECTED LOSSES | 165 | 167 | 169 | 168 |
| CORRELATION BENEFITS |  |  |  | (171) |
| TOTAL UNEXPECTED LOSSES |  |  |  | 170 |

Figure 16

METHOD FOR ASSESSING EQUITY ADEQUACY

BACKGROUND OF INVENTION

The present invention relates generally to assessing a finance company's equity adequacy and, more particularly, to a risk-based method for assessing an automotive finance company's equity adequacy.

Finance companies need to provide creditors with high confidence of repayment. Conventionally, financing companies assess their capitalization merely in terms of equity and existing debt. What the conventional analysis lacks, however, is the reliable assessment of alternate sources of creditor protection. For example, deferred taxes in the event of an overall loss can be included as equity for creditor protection. Similarly, future tax liability and future income are alternate sources of creditor protection not included in the conventional equity assessment.

Another shortfall of the conventional capitalization assessment is the absence of an unexpected loss assessment at the 99.9% confidence level for each of the finance company's categories of risk.

Furthermore, the conventional assessment fails to correlate occurrences of unexpected loss by falsely assuming that all unexpected losses occur at the same time. As a result, the conventional assessment quantifies potential uses of creditor protection at a level higher than realistically necessary.

What is needed is a risk-based method for assessing equity adequacy that integrates conventional and alternate sources of creditor protection, a risk-based assessment of unexpected loss at the 99.9% confidence level and a practical correlation between occurrences of unexpected losses.

SUMMARY OF INVENTION

A method is provided for assessing an automotive finance company's equity adequacy. New sources of creditor protection including deferred tax liability in the event of an overall loss, future tax liability and lifetime profits are quantified and compared to an estimation of the company's potential unexpected worst-case losses for each of a plurality of exposures at a 99.9% confidence level.

BRIEF DESCRIPTION OF DRAWINGS

FIG. 16 is a table illustrating an integration of correlation into a hypothetical unexpected loss calculation.

DETAILED DESCRIPTION

Figure 1:
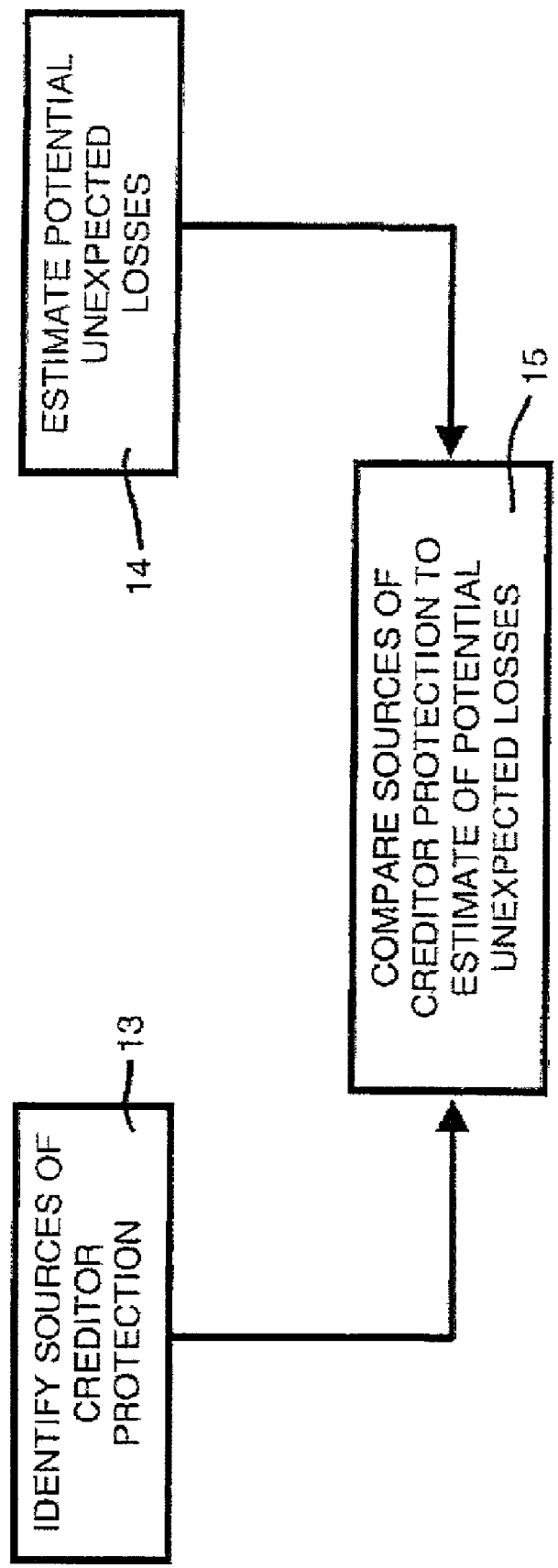
FIG. 1 is a block flow diagram illustrating an overview of a preferred embodiment of the present invention.

FIG. 1 is a block flow diagram illustrating an overview of a preferred embodiment of the present invention. Generally, the risk-based equity adequacy assessment comprises the steps of identifying sources of creditor protection as shown in block 13, estimating unexpected losses as shown in block 14 and comparing the sources of creditor protection to the unexpected losses as shown in block 15.

For purposes of clarity and understanding, the remainder of the best mode for carrying out the invention is divided into three principal sections. The first section describes the step of identifying sources of creditor protection in accord with the present invention. The second section describes estimating unexpected losses in accord with the present invention. The third section describes comparing the sources of creditor protection to the potential unexpected losses in accord with the present invention.

Figure 2:
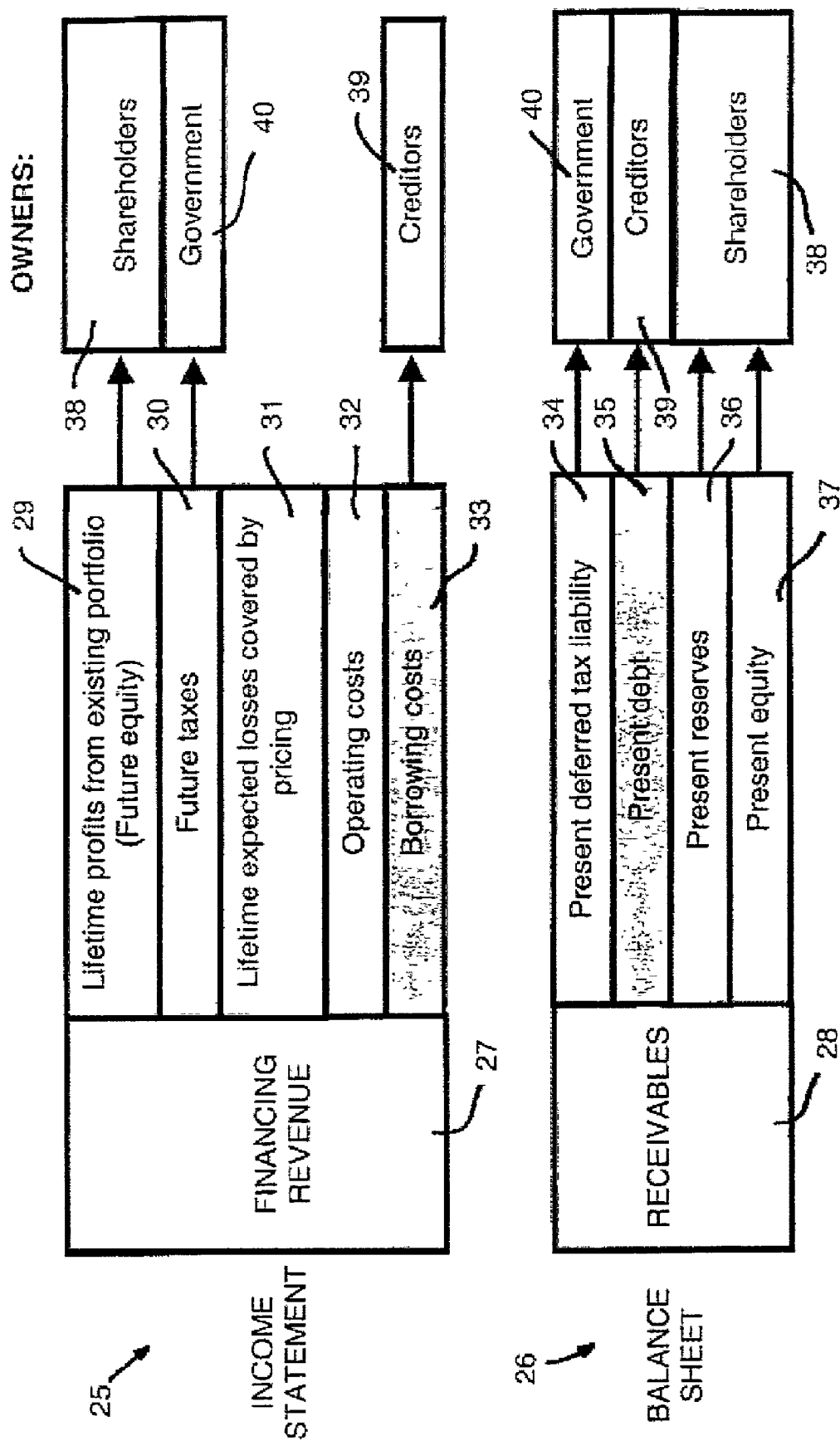
FIG. 2 is a block diagram illustrating a business model for a hypothetical automotive finance company.

Identifying Sources of Creditor Protection FIG. 2 is a block diagram illustrating a business model for a hypothetical automotive finance company. Generally, the finance company's sources of creditor protection are quantified on the projected income statement 25 (i.e., financing revenue 27) and present balance sheet 26 (i.e., receivables 28).

As defined by the projected income statement 25, revenues should cover lifetime profits from the company's existing portfolio 29, future taxes 30, lifetime expected losses covered by pricing 31, operating costs 32 and borrowing costs 33. Pricing covers all required borrowing and operating costs, expected losses, taxes and provides profits for compensation to shareholders 38.

Sources of creditor protection defined by the balance sheet 26 assets are funded with present deferred tax liability 34, present debt 35, present reserves 36 and present equity 37.

After operating costs are covered and expected losses are incurred, creditors 39 have rights to the borrowing costs 33 and debt 35. The government 40 has rights to taxes on the future earnings 30 and the present deferred tax liabilities 34. Shareholders 38 own future equity 29, present reserves 36 and present equity 37.

Figure 3:
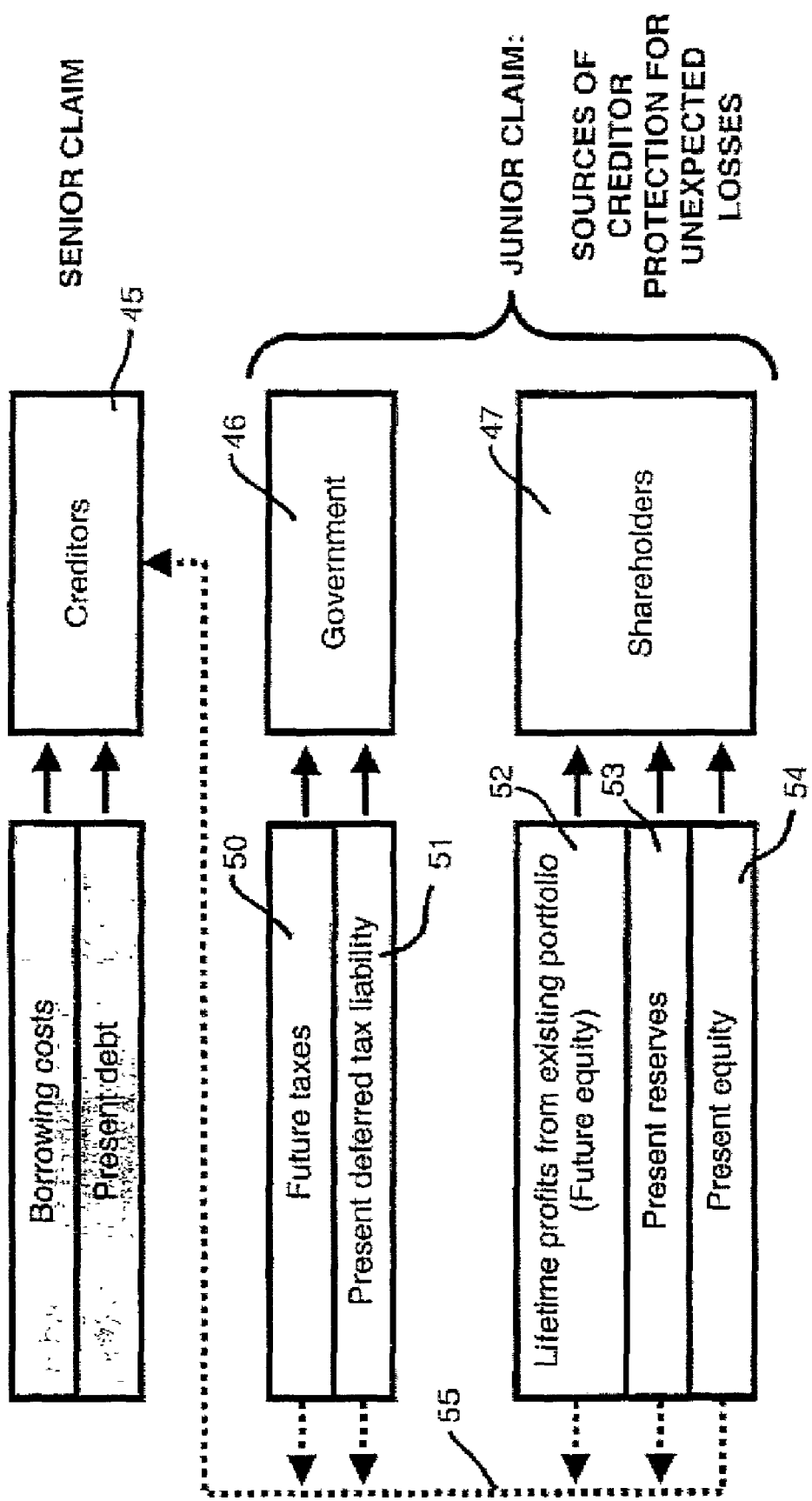
FIG. 3 is a block diagram illustrating the priority among stakeholders in the finance company's capitalization.

FIG. 3 is a block diagram illustrating the priority among stakeholders in the finance company's capitalization. Creditors 45 have a senior position relative to the government 46 and shareholders 47.

Sources of creditor protection for unexpected losses comprise projected future taxes on existing business 50, present deferred tax liability 51, projected lifetime profits from the finance company's existing portfolio (i.e. future equity) 52, present reserves 53 and present equity as quantified on the company's financial statement 54.

In the event of a net loss scenario, no future taxes 50 are due to the government 46. In addition, tax credits generated by the net loss eliminate any present deferred tax liability 51. In accord with a preferred embodiment of the present invention, the funds that the company designated to pay present deferred taxes 51 and income taxes on future earnings 50 can be applied to service debt to creditors 45, as illustrated by arrow 55.

Figure 4:
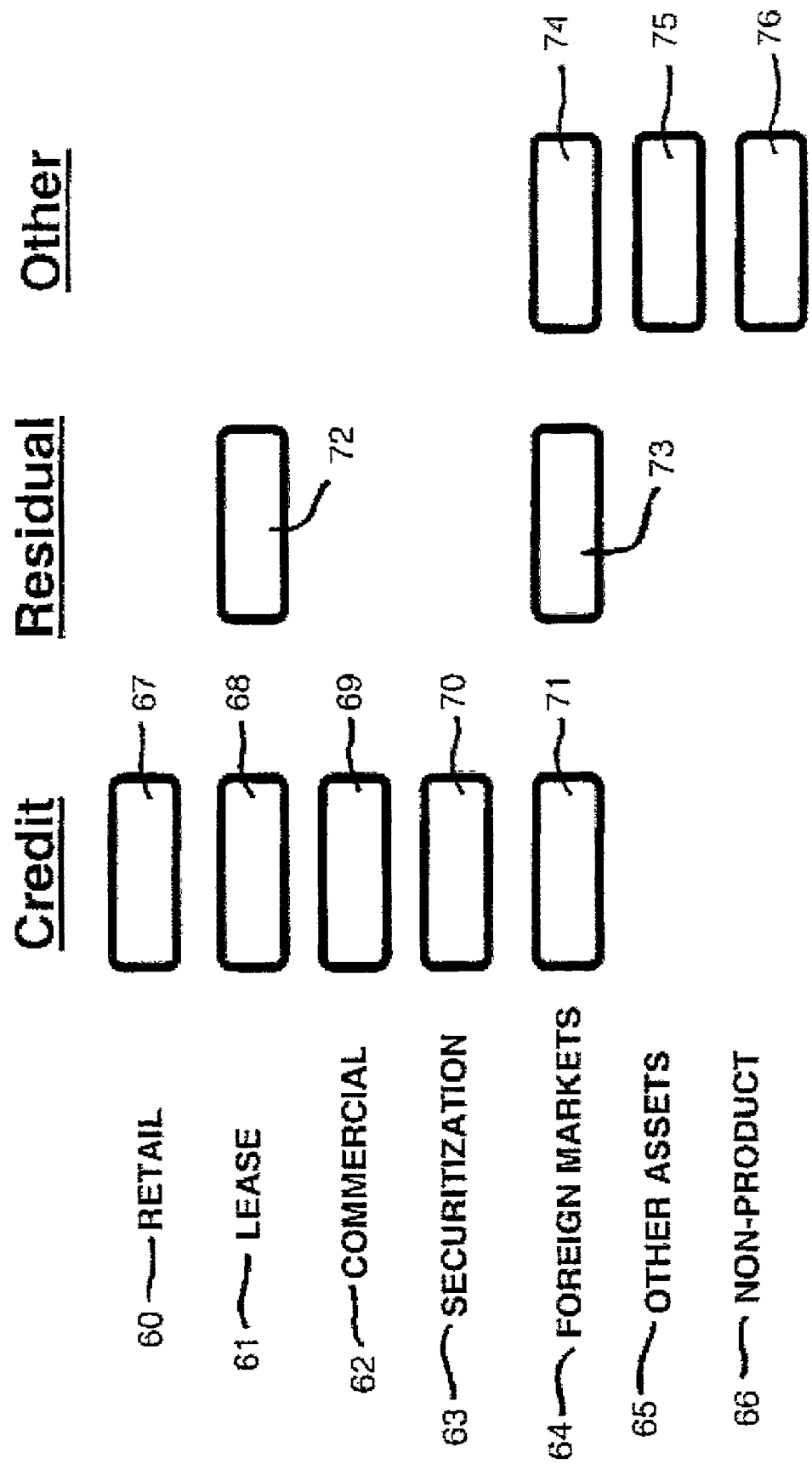
FIG. 4 is a preferred framework for estimating unexpected losses in accord with the present invention.

Estimate Potential Unexpected Losses FIG. 4 is a preferred framework for estimating unexpected losses in accord with the present invention and the hypothetical business model illustrated in FIG. 2. In accord with the hypothetical business model, the automotive finance company exposures capable of generating unexpected losses comprise retail loan receivables 60, lease assets 61, commercial loan receivables 62, securitized assets 63, foreign affiliate assets 64, miscellaneous assets 65 and non-product risks 66. Unexpected credit losses 67-71 may be generated in the retail 60, lease 61, commercial 62, securitization 63 and foreign market 64 asset classes. Unexpected residual losses 72-73 may be generated in the lease 61 and foreign market 64 asset classes. Unexpected miscellaneous losses 74-76 may be generated in the foreign market 64, miscellaneous 65 and non-product 66 asset classes.

Figure 5:
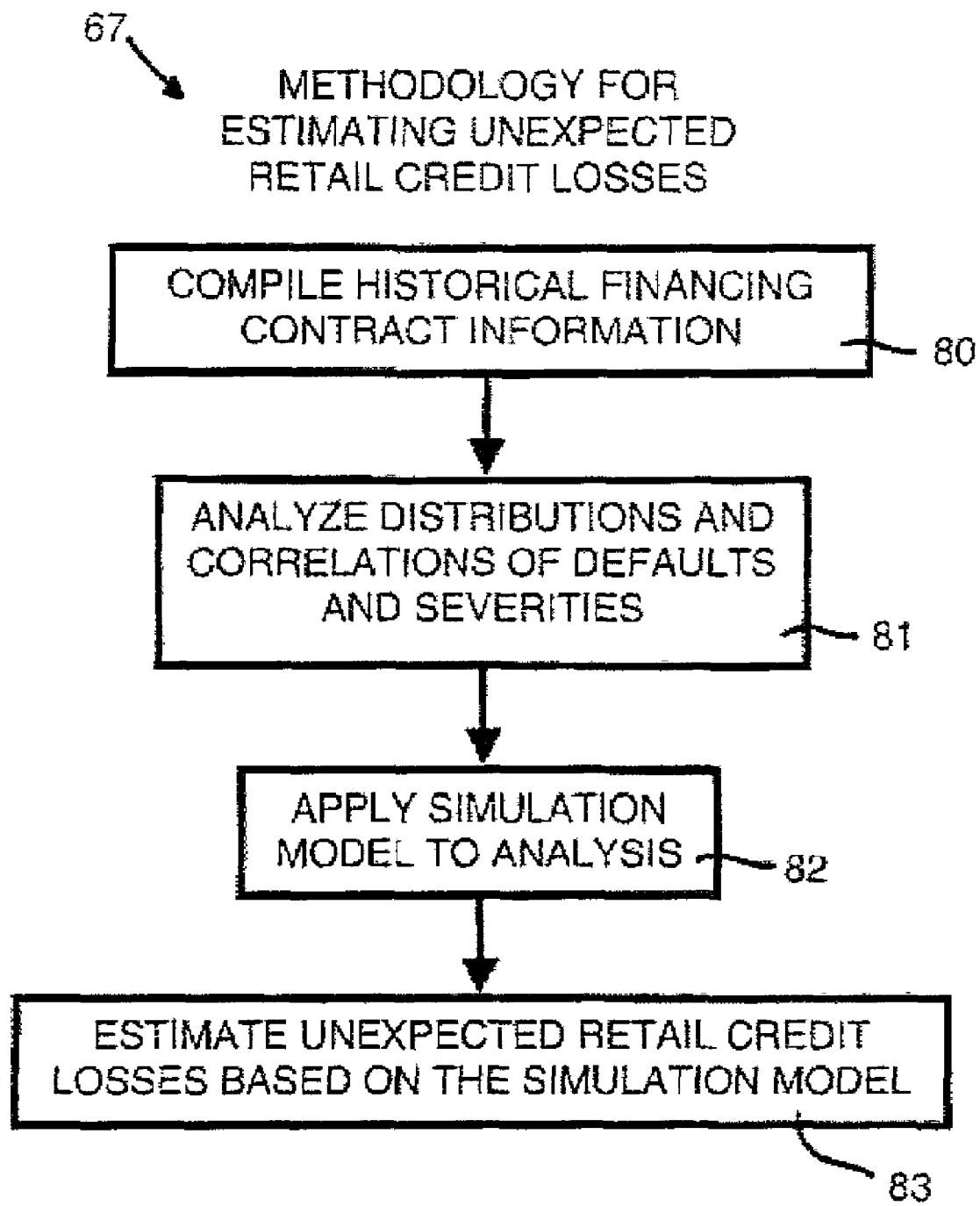
FIG. 5 is a block flow diagram illustrating a methodology for estimating unexpected retail credit losses.

FIG. 5 is a block flow diagram illustrating a methodology for estimating unexpected retail credit losses 67. In accord with a preferred embodiment of the present invention, the methodology comprises compiling a historical portfolio of fully liquidated financing contracts by loan class as illustrated in block 80, analyzing distributions and correlations of defaults and severities among the loan classes as illustrated in block 81, applying a retail credit loss distribution and correlation simulation as illustrated in block 82 and estimating unexpected retail credit losses for the entire portfolio based on the simulation as illustrated in block 83.

The portfolio of fully liquidated financing contracts 80 are segregated by loan classes in terms of contract terms, risk and products. For example, a portfolio in the automotive industry might comprise financing contracts varying in term (e.g., 36, 48, 60, 72 months etc.), product (e.g., brand, new, used, etc.), and tiers of risk.

Preferably, the simulation is run 200,000 times resulting in the distribution of potential losses. From this distribution, the probability of each level of losses occurring is estimated.

Figure 6:
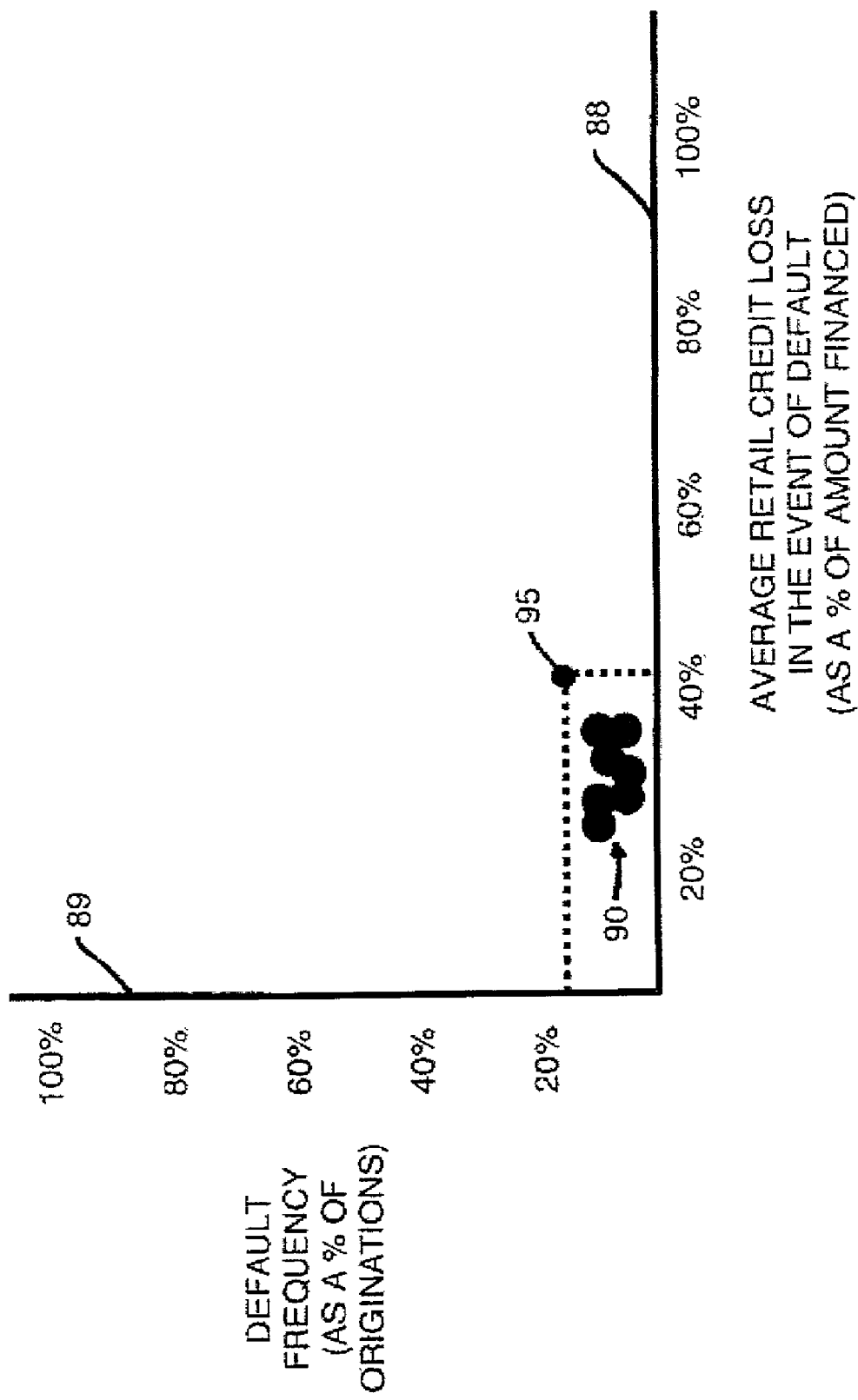
FIG. 6 is a chart illustrating a hypothetical correlation between historical financing contract defaults and the severity of those defaults.

FIG. 6 is a chart illustrating a hypothetical correlation between historical financing contract defaults and the severity of those defaults. The X-axis 88 indicates the average loss in the event of a financing contract default as a percentage of the amount originally financed. The Y-axis 89 indicates the frequency of default as a percent of origination volume. Notably, the plotted points 90 are tightly clustered demonstrating a low volatility and high predictability for the financing contract defaults. The worst-case retail credit loss 95 that can occur with 99.9% confidence is calculated based on the distribution of potential worst-case losses 90.

Figure 7:
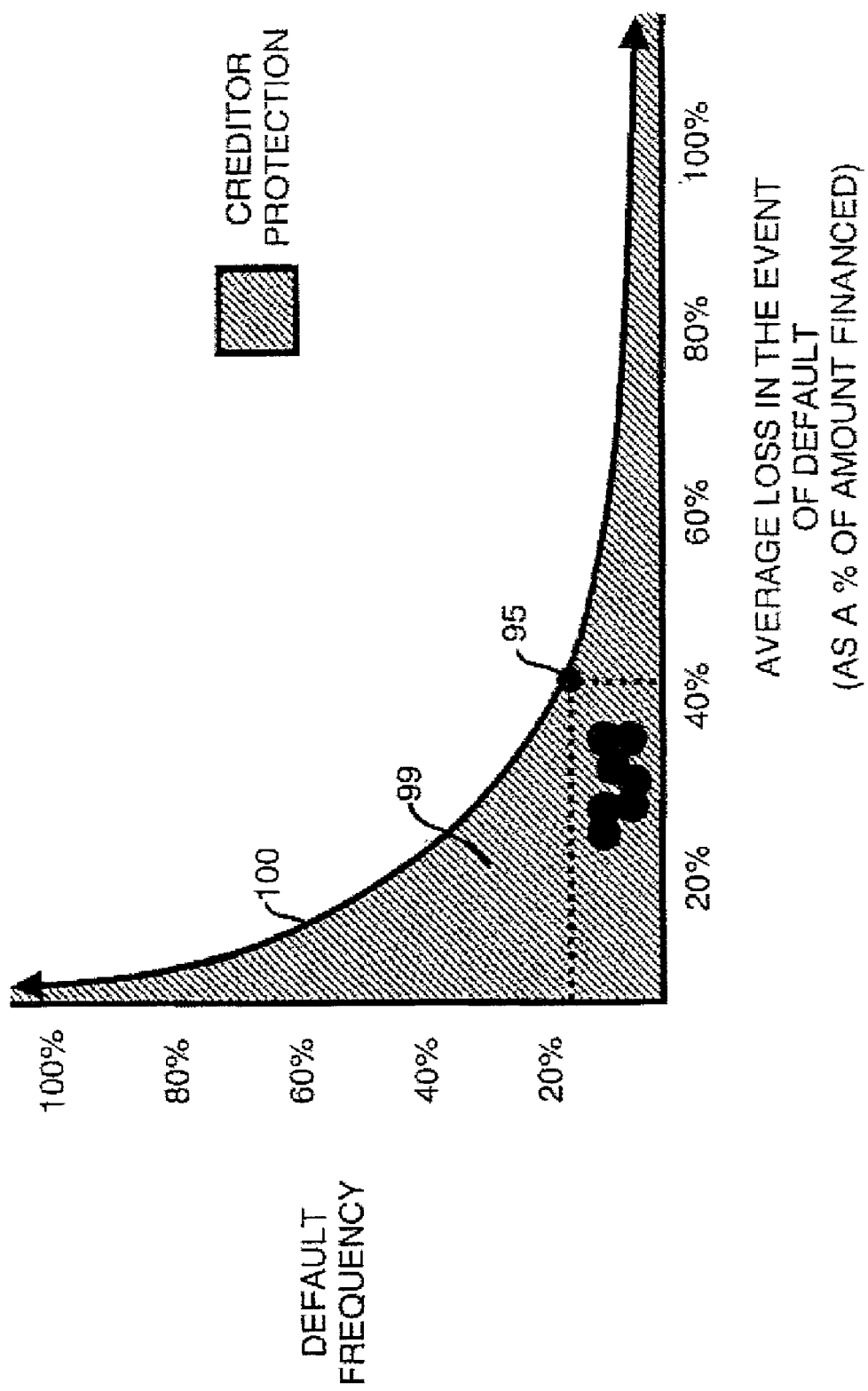
FIG. 7 is a chart illustrating a region of creditor protection based on worst-case retail credit loss.

FIG. 7 is a chart illustrating a region of creditor protection 99 based on the worst-case retail credit loss 95. All combinations of default and severity along the creditor protection line 100 equate to the worst-case retail credit loss 95. Notably, creditors are protected with 99.9% confidence for any outcome below the creditor protection line 100.

Figure 8:
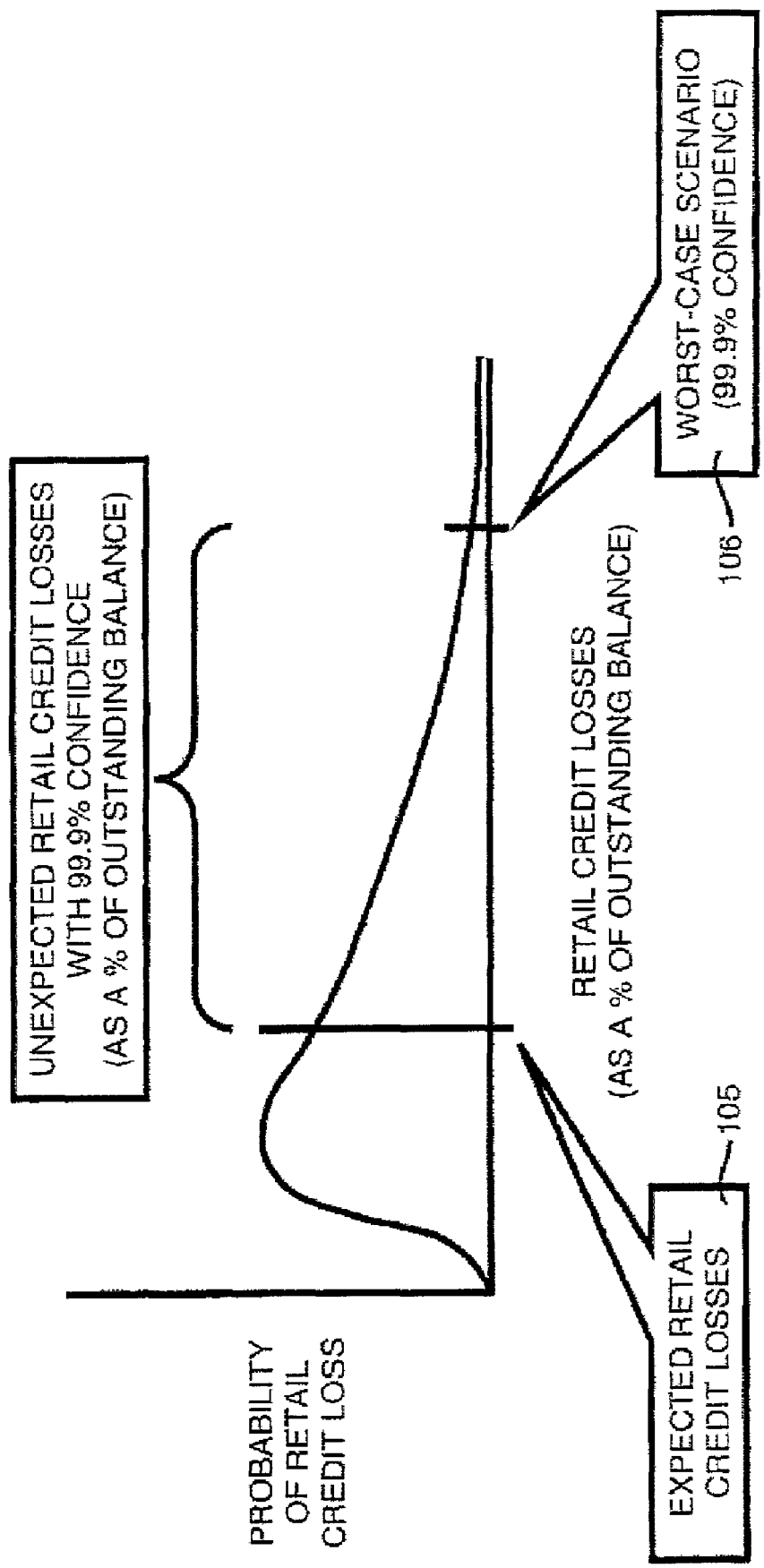
FIG. 8 is a chart illustrating unexpected retail credit losses based on the difference between expected retail credit losses and worst-case retail credit loss.

FIG. 8 is a chart illustrating unexpected retail credit losses based on the difference between expected retail credit losses 105 and the worst-case retail credit loss 106 calculated according to the results of the simulation model.

Unexpected retail credit losses with 99.9% confidence are calculated by subtracting the expected retail credit losses 105 from the worst-case retail credit loss 106.

Unlike the retail asset class, the automobile leasing asset class 61 has a relatively short history. As a result, the methodology for estimating lease credit losses is preferably based on the historical retail financing contracts having a 48 month term. Notably, this methodology is conservative due to the fact that leasing contracts are conventionally shorter than 48 months.

Figure 9:
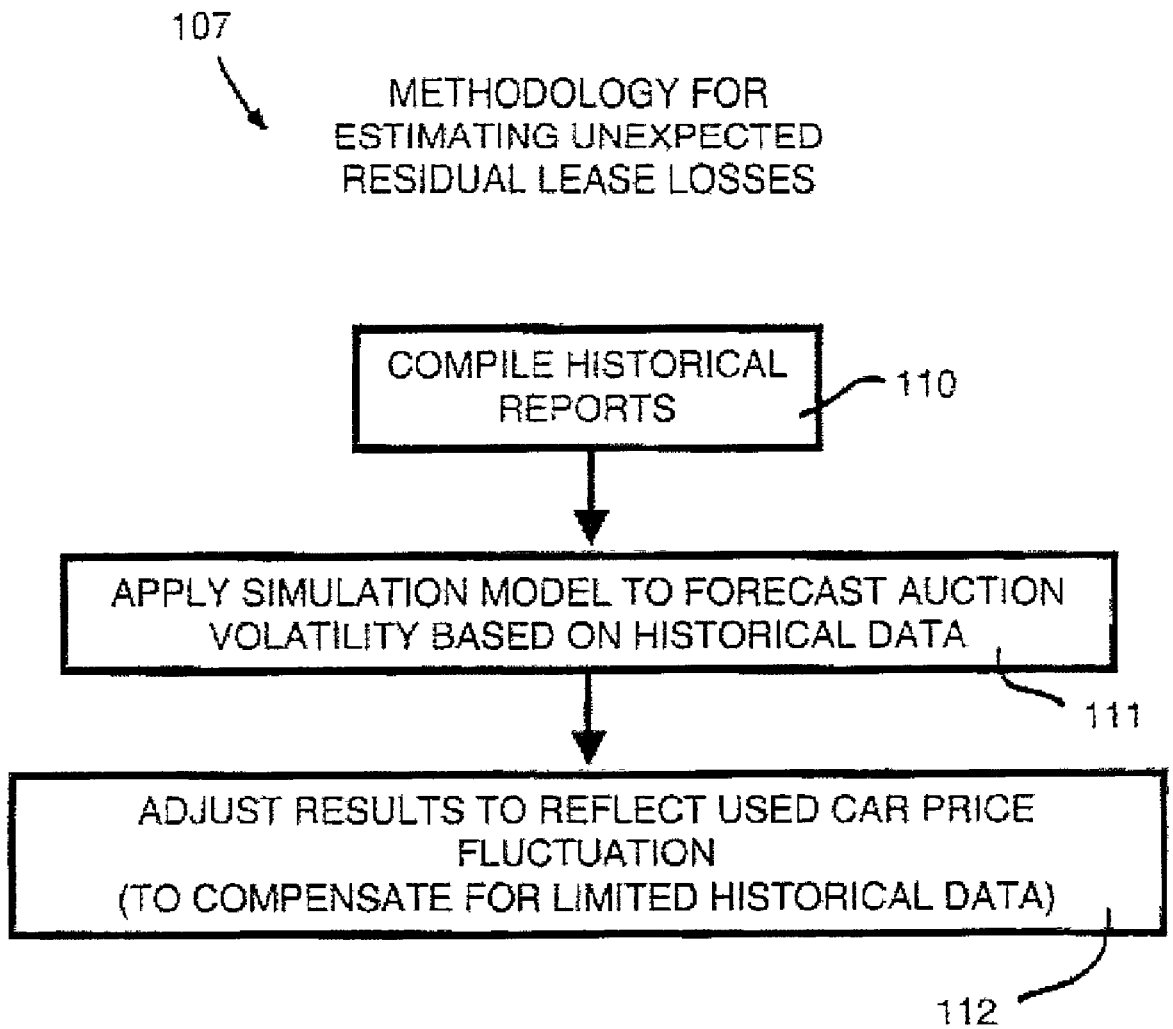
FIG. 9 is a block flow diagram illustrating a methodology for estimating unexpected residual lease losses.

FIG. 9 is a block flow diagram illustrating a methodology 107 for estimating unexpected residual lease losses. In accord with a preferred embodiment of the present invention, the methodology comprises compiling a historical portfolio of fully liquidated leasing contracts, post-lease auction values and used-car price fluctuation data as illustrated in block 110, forecasting auction price volatility as illustrated in block 111 and adjusting the model to reflect used car price fluctuation (to compensate for limited historical data) as illustrated in block 112.

Forecasting auction price volatility comprises quantifying auction price fluctuations due to unknown and unpredictable factors. Accordingly, auction price variations due to seasonality or vehicle refreshenings are not treated as part of volatility. To forecast auction volatility, economic models are applied to the historical profile for factoring out auction price variations due to seasonality and refreshenings.

Unexplained errors associated with the econometric models measure the auction price volatility. A 99.9% confidence lower bounds for the volatility forecast is calculated according to the worst auction price realizations. Depreciation curves are implemented to calculate additional amount of depreciation from a 24-month term to a 36-month term. In addition, 100% return rates are assumed for every non-defaulting vehicle. Accordingly, it is assumed that every non-defaulting vehicle is returned and experiences a worst-case residual loss.

Figure 10:
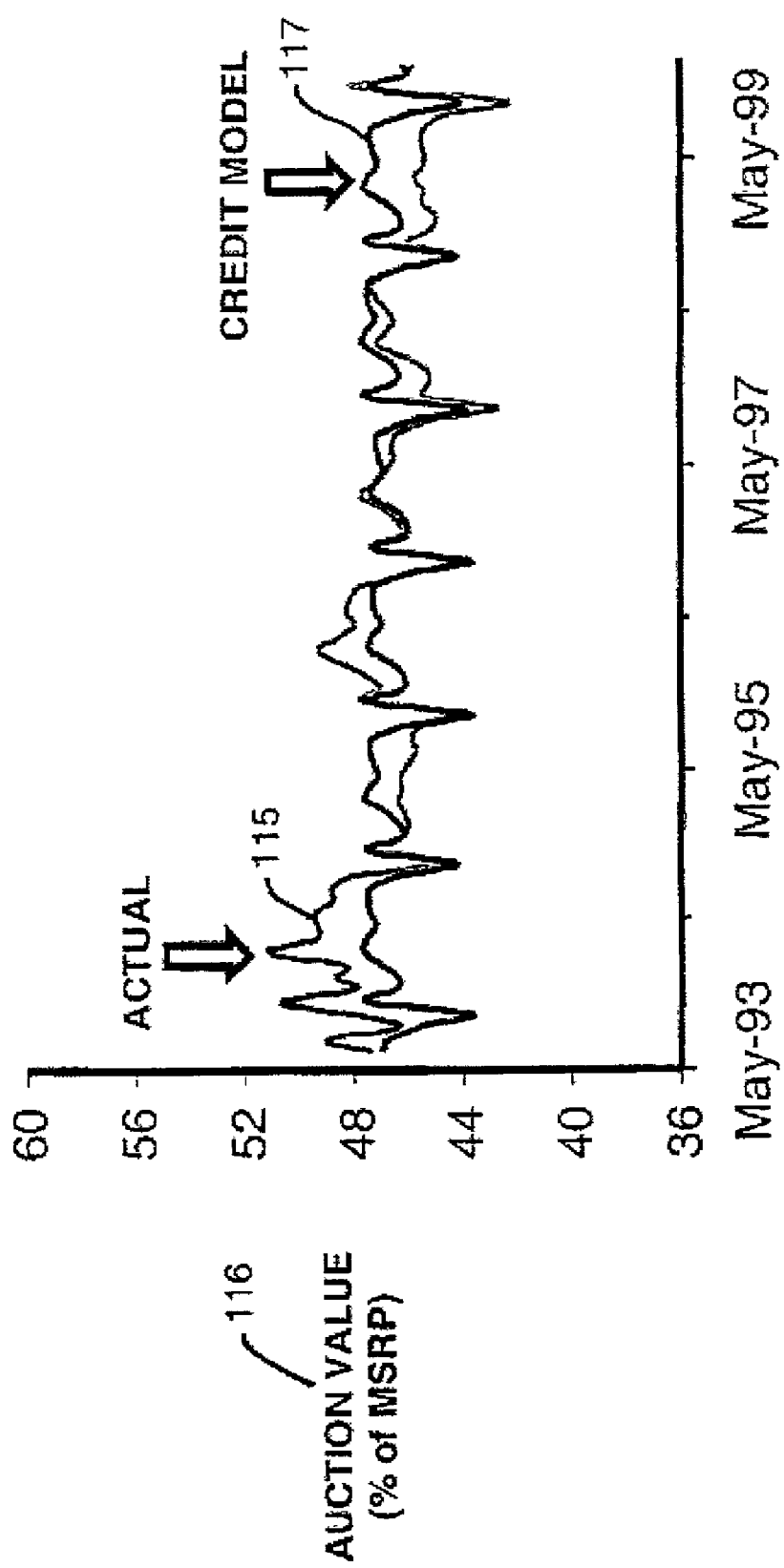
FIG. 10 is a chart illustrating a comparison between actual past auction values as a percent of manufacturer suggested retail price (MSRP) and past auction values simulated in accord with the present invention.

FIG. 10 is a chart illustrating a comparison between actual past auction values 115 as a percent of manufacturer suggested retail price (MSRP) 116 and simulated past auction values 117 defined using the forecasting model discussed in FIG. 9. Notably, the forecasting model closely reflects the actual values of the automobile auction market.

Figure 11:
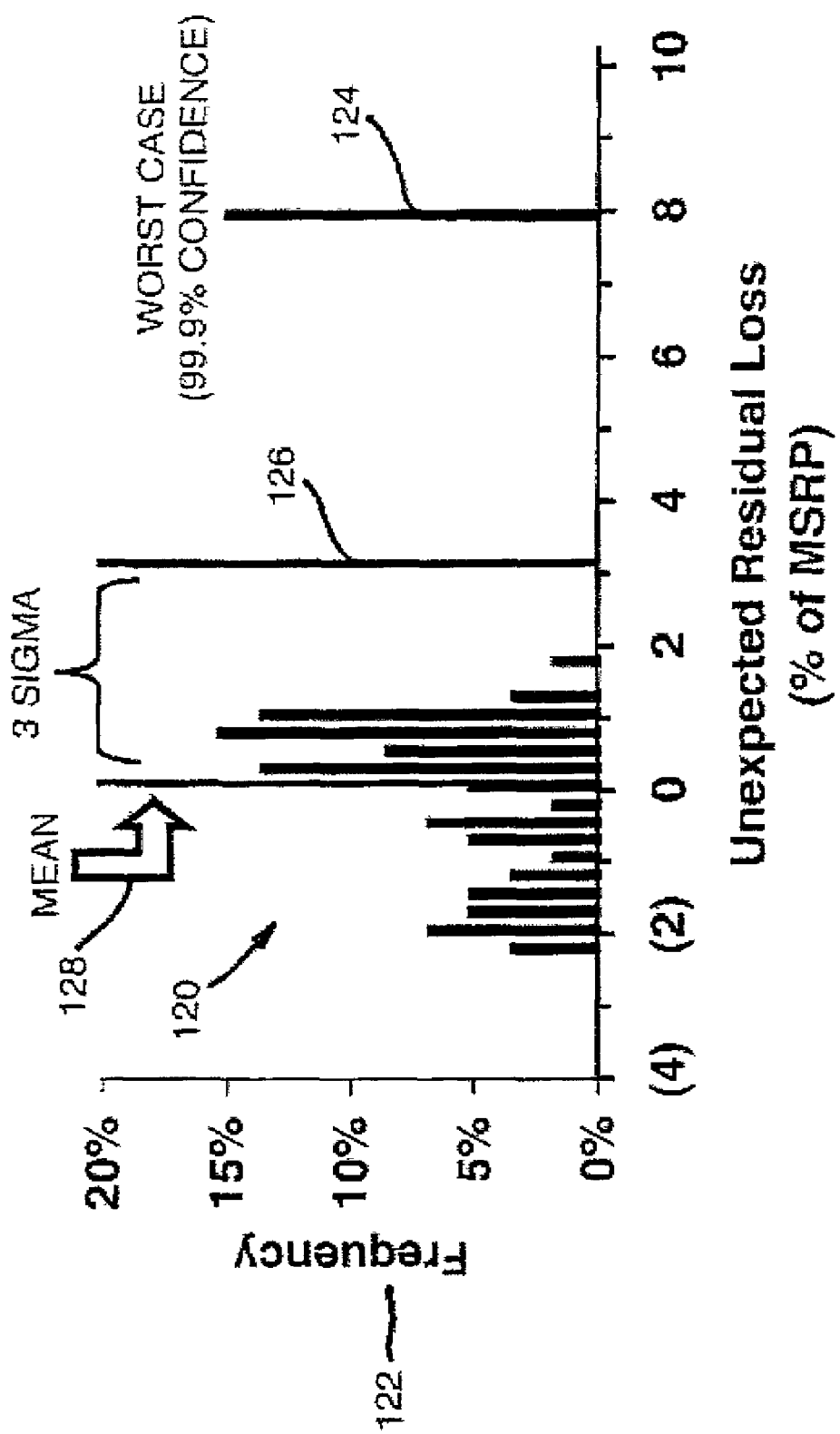
FIG. 11 is a chart illustrating the inaccuracy of an auction value forecasting simulation.

FIG. 11 illustrates the level that the forecasting model discussed in FIG. 10 missed actual unexpected residual loss values 120 and the frequency 122 of each outcome. Notably, creditor protection 124 is provided to the worst case with 99.9% confidence—a value significantly beyond historical experience and three sigma (standard deviations) 126 of the mean forecasted auction values 128.

Figure 12:
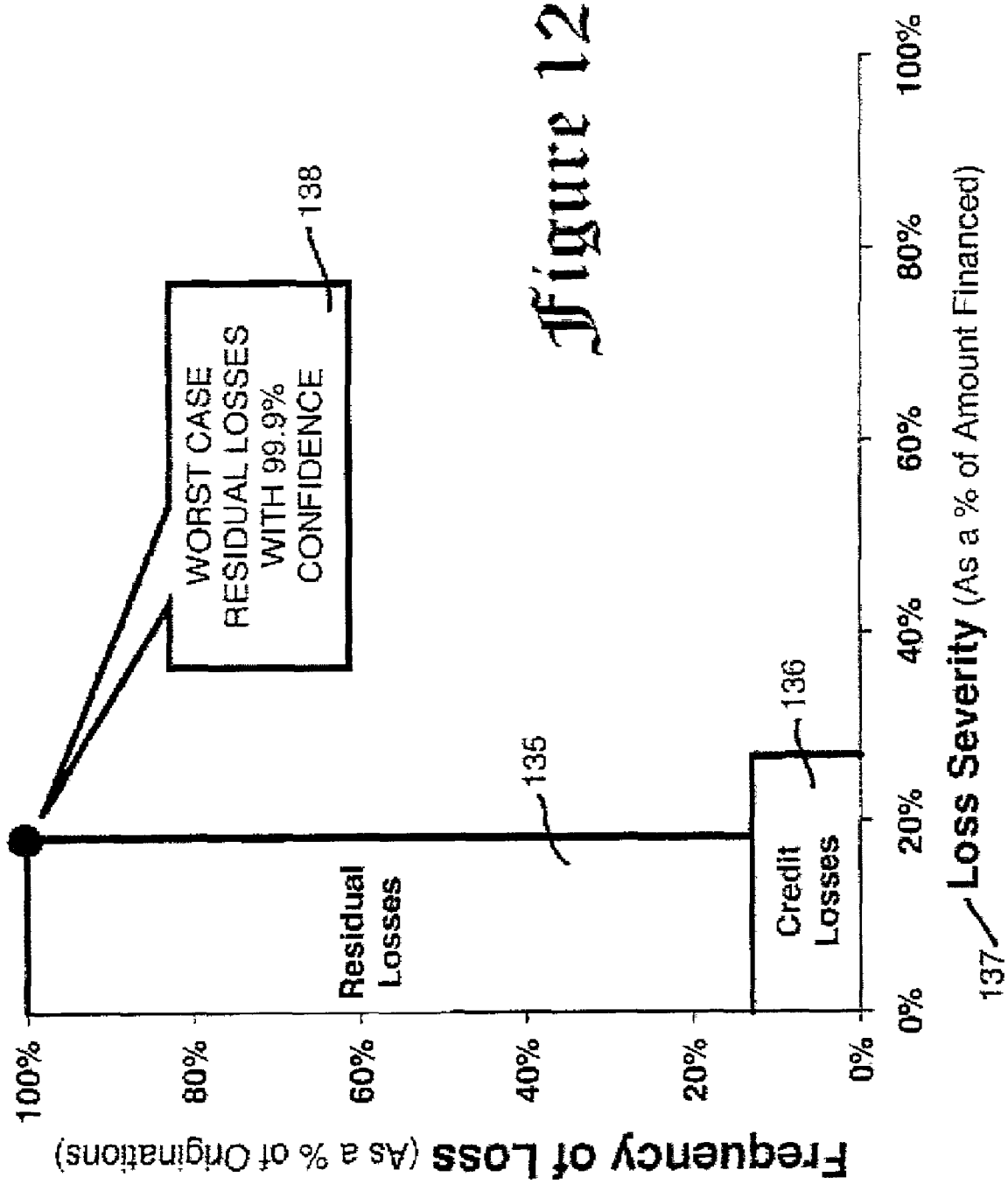
FIG. 12 is a chart illustrating the frequency of residual lease losses and credit lease losses as a function of loss severity.

FIG. 12 is a chart illustrating the frequency of residual lease losses 135 and credit lease losses 136 as a function of loss severity 137. In accord with a preferred embodiment of the present invention, worst-case residual lease loss is calculated according to Equation 1.

Lifetime residual lease losses=% of returned vehicles
X loss severity Eqn. 1

Figure 13:
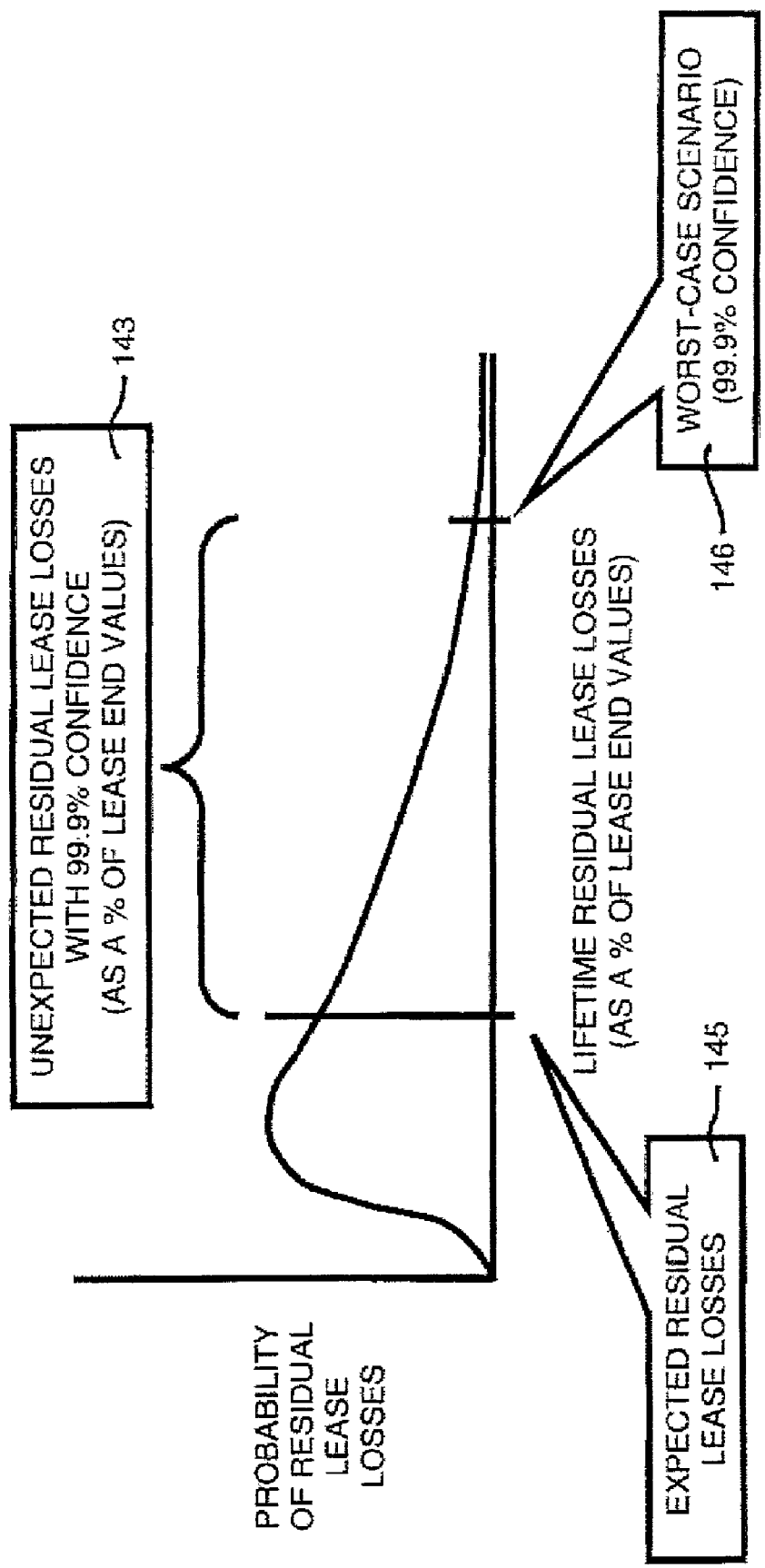
FIG. 13 is a chart illustrating unexpected residual lease losses based the difference between expected residual lease losses and a simulated worst-case residual lease loss.

FIG. 13 is a chart illustrating unexpected residual lease losses based the difference between expected residual lease losses 145 and the simulated worst-case residual lease loss 146 defined according to Equation 1.

Figure 14:
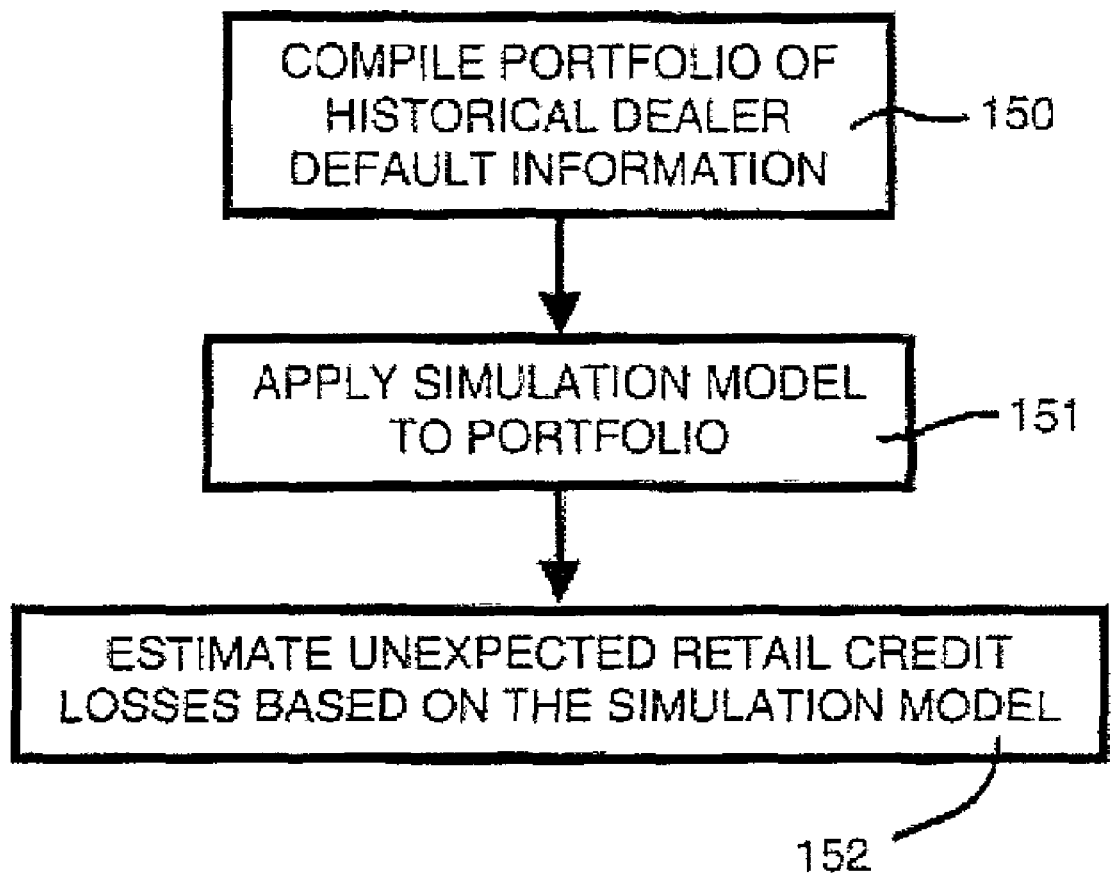
FIG. 14 is a block flow diagram illustrating a methodology 147 for estimating unexpected commercial losses.

FIG. 14 is a block flow diagram illustrating a methodology 147 for estimating unexpected commercial losses 62 in accord with the present invention. In accord with a preferred embodiment of the present invention, the methodology comprises compiling a historical portfolio of automobile dealer defaults as illustrated in block 150, applying a simulation model to assess the worst case scenario for the commercial loan portfolio, as illustrated in block 151 and calculating the unexpected commercial losses based on the simulation as illustrated in block 152.

Preferably, the historical portfolio of automobile dealer defaults comprises dealer concentration data, severity of default data, loan type data (e.g., floor plan loans that are fully secured by new vehicles, dealer mortgage loans, dealer capital loans, commercial leasing and rentals) and probability of payment data. For default rates among dealers, the historical data is analyzed to determine the default frequency of the worst year as the worst-case scenario in the unexpected commercial loss calculation.

Preferably, the simulation model is run 200,000 times resulting in the distribution of potential commercial losses. Using a conservative approach, the simulation model assumes that the worst-case default rate will continue for five years. For example, a 1-year dealer default rate of 1% yields a 5% 5-year dealer default rate. Preferably, the assumed losses are based on dealer commitment levels, not outstanding balances.

The methodology for calculating securitization losses 63 assumes that unexpected securitization losses are consistent with those of on-balance sheet assets by product. The securitization methodology also treats loans as on-balance sheet unless a true risk transfer has been achieved (i.e., the sale of tranches with a lower rating than the manufacturer's present rating or the sale of whole loans).

In accord with a preferred embodiment of the present invention, the unexpected securitization losses from each asset pool (e.g., retail, floor plan and lease) are calculated by multiplying the asset pool balances by their respective unexpected loss percentages. Any transfer of risk is subtracted from the total of unexpected securitization losses from each asset pool.

The methodologies for calculating unexpected credit and residual losses in foreign markets 64 is consistent with the respective credit and residual methodologies described supra.

Miscellaneous assets 65 comprise assets on the manufacturer's balance sheet that have not been included in the retail 60, lease 61, commercial 62, securitization 63 and foreign market 64 unexpected loss analysis. For example, miscellaneous assets 65 might include vehicles in the auction pipeline, prepaid insurance, cash & securities, deferred charges, parts & accessories, good will and property & equipment. Unexpected losses for vehicles in the auction pipeline are calculated based on the lease methodology described supra. Unexpected losses for the remaining miscellaneous assets (i.e., those assets not material in size and risk) are calculated based on management's perception of the risk.

Non-product assets 66 primarily comprise interest rate risk and legal risk. Interest rate risk reflects the joint probability of adverse interest rate movements and the planned interest rate mismatch on a portion of the manufacturer's portfolio. A simulation model is implemented to reflect the joint probability resulting in the distribution of potential losses. From this distribution, the probability of each level of losses occurring is estimated.

Legal risk reflects the first loss on potential lawsuits and fraud under the manufacturer's current insurance policy based on management's perception of the risk.

Figure 15:
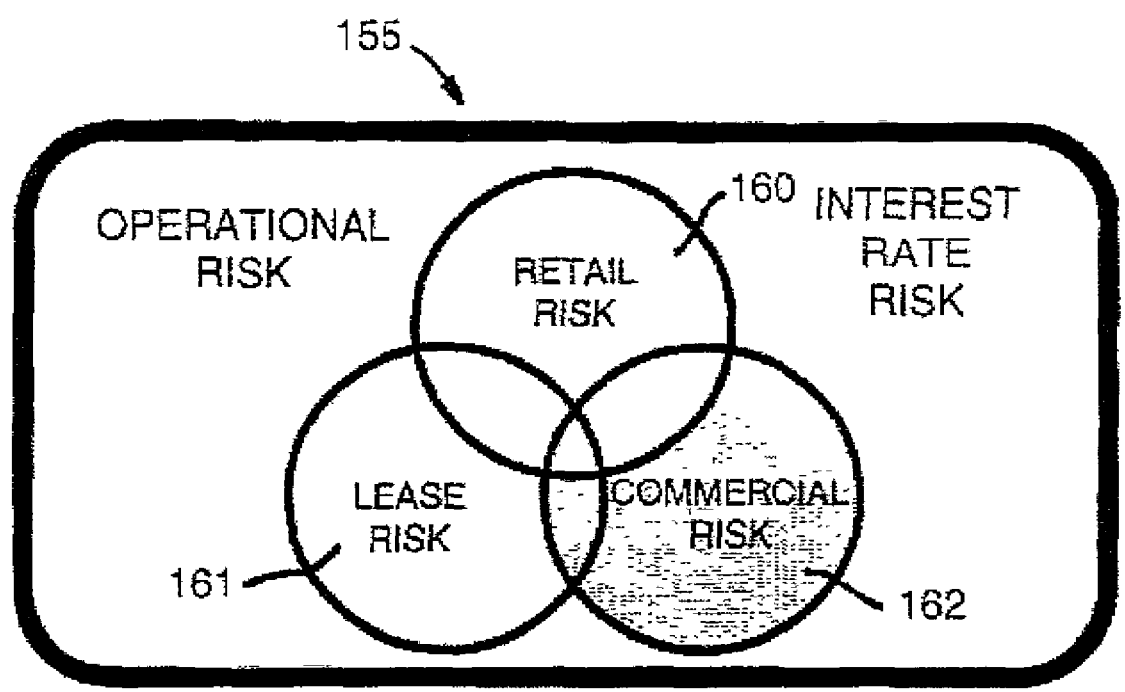
FIG. 15 is a Venn diagram illustrating the correlation of retail risk, lease risk and commercial risk in accord with the present invention.

FIG. 15 is a Venn diagram 155 illustrating a fundamental assumption of the present invention: that the correlation of retail risk 160, lease risk 161 and commercial risk 162 reduces unexpected loss. In accord with the present invention, it is assumed that these risks are interrelated and cannot occur simultaneously. For example, assume that a manufacturer experiences worst-case credit losses. As the demand for new cars decreases, the demand for used cars increases because the need for transportation does not decline as much as new vehicle sales. Therefore, in a downturn, used car prices are unlikely to be at their worst level.

FIG. 16 is a table illustrating an integration of the correlation assumption into a hypothetical example unexpected loss analysis. Assume for the hypothetical example that historical government data regarding bankruptcies, delinquencies and their interrelationship, yields an average correlation of 0.5. Applying the 0.5 correlation to the unexpected credit losses 165, the unexpected residual losses 167 and the other unexpected losses 169 in a simulation model yields a correlation benefit 171. Subtracting the correlation benefit 171 from the unexpected loss total 168 yields an adjusted unexpected loss total 170.

Comparing Sources of Creditor
Protection to Unexpected Losses

Figure 17:
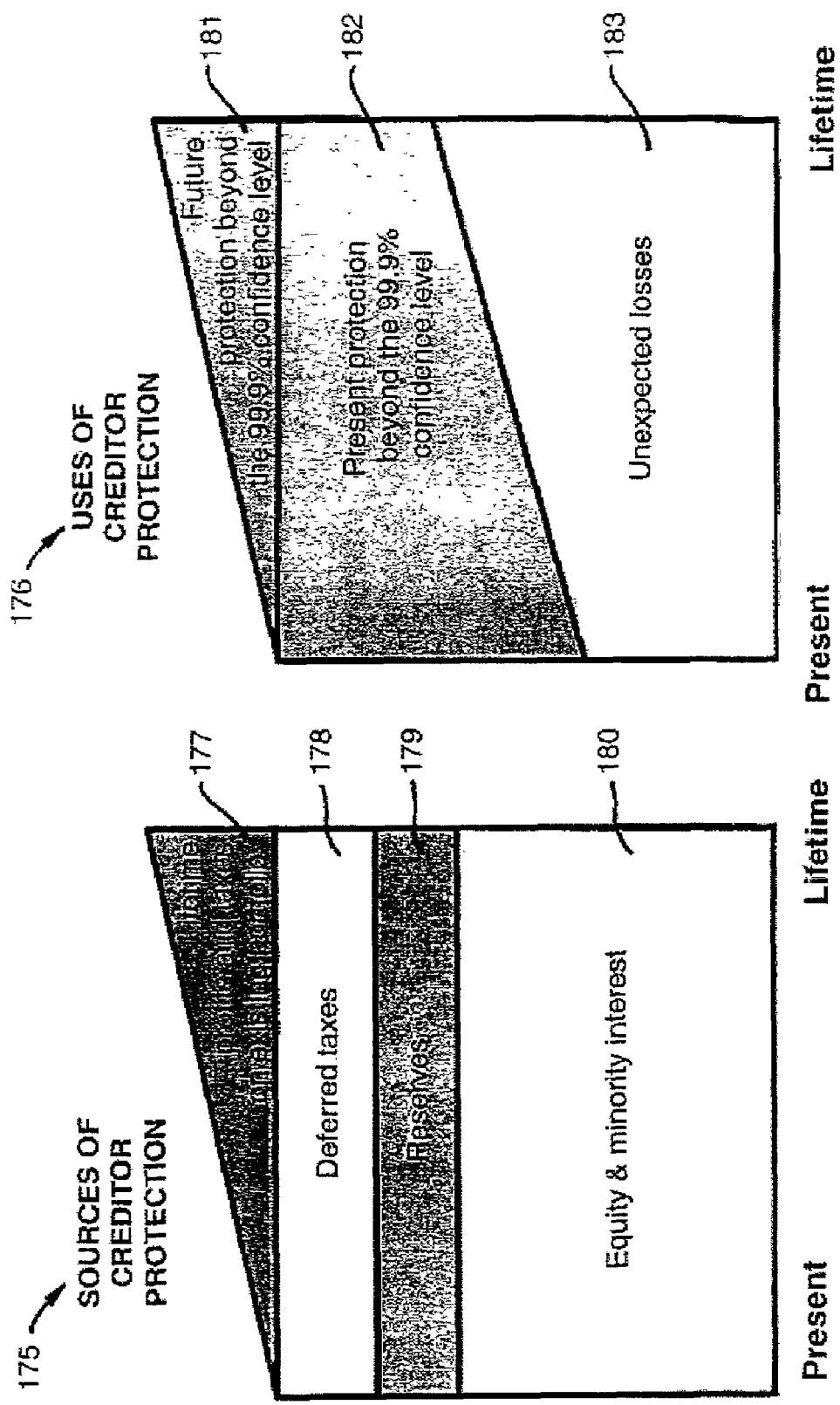
FIG. 17 is a chart comparing sources of creditor protection to the uses of creditor protection over the lifetime of a finance company's products.

FIG. 17 is a chart illustrating the sources of creditor protection 175 as compared to the uses of that protection 176 over the lifetime of the finance company's products. In accord with the present invention, sources of creditor protection 175 comprise lifetime profits and taxes 177, deferred taxes 178, reserves 179 and equity & minority interest 180. Uses of creditor protection 176 comprise future protection beyond the 99.9% confidence level 181, present protection beyond the 99.9% confidence level 182 and unexpected losses 183.

Lifetime profits and taxes 177 assume a conservative after-tax return on equity for non-defaulting contracts within the existing portfolio. As illustrated, lifetime profits 177 ramp-up over the lifetime of the portfolio.

Unexpected losses 183 are shown at an increasing rate over the lifetime of the manufacturer's products based on the assumption that all unexpected losses will not occur on day one. For example, residual losses can only occur as leases mature. Lessees do not have the option of returning a lease vehicle early without making the manufacturer whole on the lease contract or defaulting.

Notably, FIG. 17 illustrates a comparison between sources and uses of creditor protection during a profitable fiscal year. In the event worst cases losses occur, no taxes will be due and no dividend payments will be made. In accord with a preferred embodiment of the present invention, the funds originally planned to pay taxes and dividends are used to service debt.

As FIG. 17 illustrates, the finance company can provide its creditors with protection beyond the 99.9% confidence level 182. This protection is supplemented with future protection beyond the 99.9% confidence level 181, which is provided by the non-defaulting contracts in the existing portfolio.

While the best mode for carrying out the invention has been described in detail, those familiar with the art to which this invention relates will recognize various alternative designs and embodiments for practicing the invention as defined by the following claims.

The invention claimed is:

1. A method for assessing an automotive finance company's equity adequacy comprising:
    quantifying the company's sources of creditor protection wherein the sources comprise equity, reserves and net deferred tax liability in the event of an overall loss;
    estimating the company's potential unexpected worst-case losses for each of a plurality of exposures with 99.9% confidence; and
    comparing the company's creditor protection to the company's potential unexpected worst-case losses to demonstrate the company's equity adequacy.

2. The method of claim 1 wherein the sources of creditor protection additionally comprise future tax liability.

3. The method of claim 1 wherein the sources of creditor protection additionally comprise lifetime profits.

4. The method of claim 1 wherein a simulation model is implemented to estimate the company's potential unexpected worst-case losses for each of a plurality of exposures with 99.9% confidence.

5. The method of claim 1 wherein potential unexpected worst-case residual lease exposures are estimated using economic models to factor out historical auction price variations due to seasonality and refreshenings.

6. The method of claim 5 wherein an assumption is made in the estimation of potential unexpected worst case residual lease exposures that every non-defaulting lease vehicle is returned and experiences a worst-case residual loss.

7. The method of claim 1 wherein the sources of creditor protection comprises asset classes junior to creditor claims.

8. The method of claim 1 additionally comprising applying a risk correlation value to the estimated unexpected worst-case losses to yield a risk-adjusted unexpected loss estimate.

* * * * *